A. CHRISTIANSON.
NON-RATTLING SPRING.
APPLICATION FILED OCT. 22, 1912.
1,064,710.
Patented June 17, 1913.
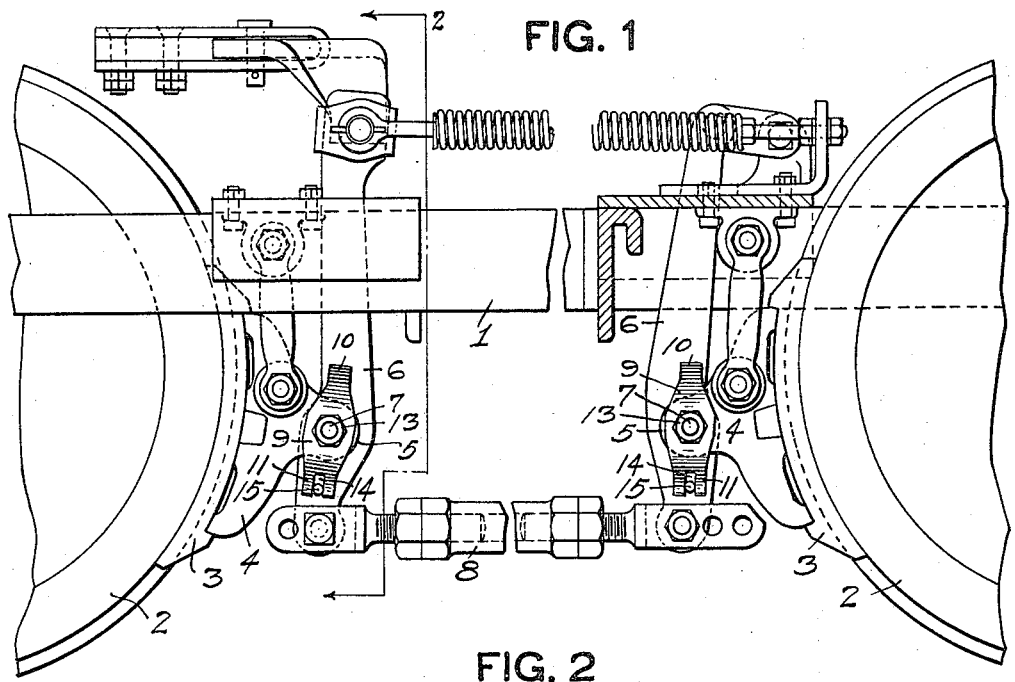
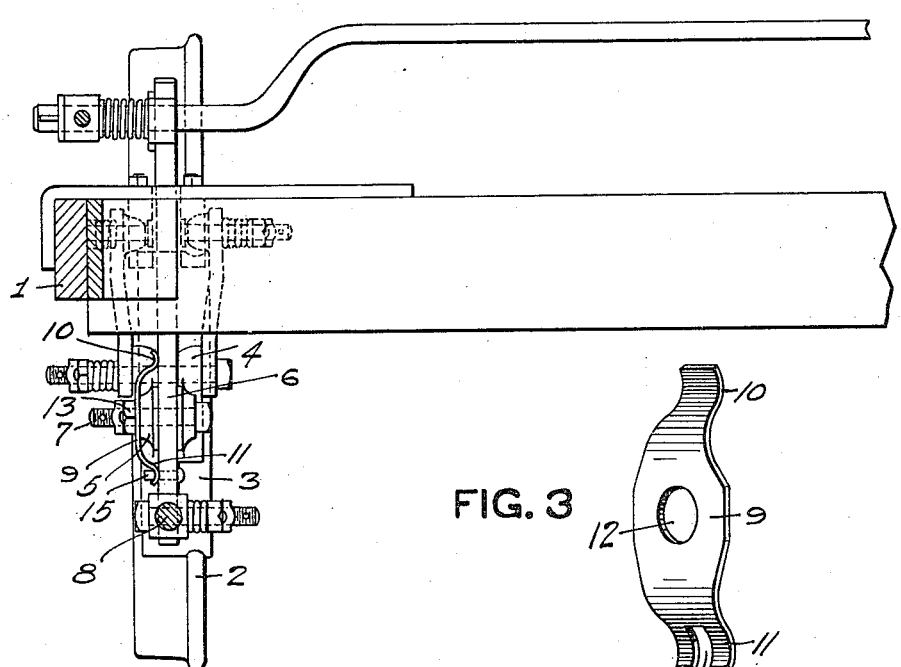
WITNESSES.
INVENTOR.

UNITED STATES PATENT OFFICE.

ANDREW CHRISTIANSON, OF BUTLER, PENNSYLVANIA, ASSIGNOR TO STANDARD MOTOR TRUCK CO., OF PITTSBURGH, PENNSYLVANIA, A CORPORATION OF PENNSYLVANIA.

NON-RATTLING SPRING.

1,064,710.

Specification of Letters Patent.

Patented June 17, 1913.

Application filed October 22, 1912. Serial No. 727,269.

*To all whom it may concern:*

Be it known that I, ANDREW CHRISTIANSON, a citizen of the United States, and resident of Butler, in the county of Butler and State of Pennsylvania, have invented a new and useful Improvement in Non-Rattling Springs; and I do hereby declare the following to be a full, clear, and exact description thereof.

My invention relates to a device for preventing undue play and rattling between jointed parts, and is particularly advantageous when employed in connection with the joints of brake gearing for vehicles, although it is to be understood that it is not limited in application to gearing of this character.

The invention has for its object a device of this character which may be economically manufactured, readily applied and having means whereby it may be held in proper position with respect to the parts with which it is used.

The invention has the further advantage that it takes up very little space when in position and does not appreciably increase the width of the joint. This is of peculiar advantage where economy of space is important.

In the drawings herewith which illustrate one embodiment and application of my invention, Figure 1 is a side elevation in brake gearing for a car truck showing the invention applied thereto; Fig. 2 is a sectional view on the line 2—2 looking to the left; and Fig. 3 is a perspective view of the device embodying the invention.

Referring to the Figs. 1 and 2, 1 indicates an equalizer bar of a truck frame of the usual construction, the ends of which bear upon the journal boxes (not shown) within which the axles of the wheels 2 are journaled. 3 indicates the brake shoes mounted in the brake head 4. Said head is and may be of the usual construction having a bifurcated lug 5 pivoted to the brake lever 6 by a bolt 7. The levers 6 of the brakes may be connected by the usual adjustable draw bar 8. The remaining structure of the brake gear may be of usual form, but since it forms no particular part of the present invention, further description thereof will be omitted. It is essential to the effective operation of brake gearing of this character that all jointed parts have more or less free play in order that there may be no binding action which will interfere with the effective application of the brakes to the wheel. Therefore, it is a common practice to make the joints of said gearing more or less loose or of easy play. This is particularly necessary in the joint between the brake lever and the brake head in order that the brake shoe may be applied with equal force through its length to the wheel. Therefore, unless some provision is made to prevent it, considerable rattling and wear and noise results when the truck is in motion and when the brakes are applied or released. It is for the purpose of preventing this rattling and wear that I have devised the present invention which comprises a more or less half bowed spring member 9 having the curved bearing extensions 10 and 11. Substantially central of the device is a bolt aperture 12 for the reception of the bolt, by which the bolted parts are pivoted together.

Referring to Fig. 2 it will be seen that in the connection 4 and the lever 6 the parts of the bifurcated lug 5 of the brake head lie upon either side of the lever 6. The bowed central portion of the spring 9 may rest upon one side of this lug and be interposed between the same and the lock nut 13 by which the pivoting bolt 7 is held in place. The curved extensions 10 and 11 of the spring member are inclined inwardly around the lug 5 and bear against the lever 6 at either side of the joint. By this construction, it will be seen that the spring member has a tendency to constantly draw the head of the bolt 7 snugly against the adjacent portion of the lug 5 and to hold the joint as a whole against rattling or too free play. This, furthermore, is accomplished without extending materially the width of the joint since in using this spring the only increase in width is that necessitated by the thickness of the comparatively thin, flat spring member 9. To secure the same result, with for example, a spiral spring, would necessitate mounting a spring of several coils upon the end of the connecting bolt 7, so that the lock nut 13 would necessarily stand some considerable distance out from the lug 5, thereby considerably increasing the width of the joint. This widening of the joint would be particularly detrimental and in many cases impracticable where economy of space occupied by the joint was necessary. With a device of this character, on the other hand, it will be seen that by reason of the fact that the spring arms or extensions 10 and 11 extend down upon either side of the lug 5 no appreciable widening of the joint results. In order to maintain this spring member in proper position relatively to the parts of the joint, one of these extensions as 11 for example, may be bifurcated as at 14 to receive the head of the rivet pin 15 projecting from the lever 6. This construction in the case here illustrated will maintain the spring member in substantial alinement with the lever 6 so that its curved ends will be maintained in constant bearing position with respect to the member 6.

What I claim is:

1. A device for preventing the rattling and wear of jointed parts consisting of a leaf spring having a bowed central portion adapted to rest on one of the joint members and having a bearing extension adapted to extend down at the side of said joint member and having a bearing upon the other joint member, and means for connecting the jointed parts and holding said spring in position.

2. A device for preventing the rattling and wear of jointed parts consisting of a bowed leaf spring apertured intermediate its ends to receive the connecting bolt of the joint and having bearing extensions adapted to extend down upon either side of one of said jointed parts and bear upon the other of said jointed parts and means for holding the jointed parts together and for maintaining the spring member in proper bearing position.

3. A device for preventing rattling and wear of jointed parts consisting of a leaf spring having an aperture for the reception of the joint bolt or pin and having an extension adapted to extend down at the side of one of said jointed members and bear upon the other jointed member, in combination with a fastening member for holding said pin, said jointed members and said spring members together and means for holding the bearing portion of said spring in proper bearing position.

4. A device for preventing rattling and wear of jointed parts consisting of a bowed leaf spring centrally apertured to receive the joint pin or bolt, said spring member having opposite extensions adapted to extend down upon either side to one of said joint members and bear upon the other joint member at either side of their junction, said joint members, bolt and spring being held together by the joint bolt and nut, one of said spring extensions having means to engage a complemental part of one of said joint members to maintain the spring in proper bearing position.

5. A device for preventing rattling and wear of jointed parts consisting of a bowed leaf spring having a central aperture to receive the bolt of the joint and having arms adapted to extend down upon either side of the jointed members to bear upon the other jointed member, and means for holding said spring in proper bearing position on said second member.

In testimony whereof, I the said ANDREW CHRISTIANSON have hereunto set my hand.

ANDREW CHRISTIANSON.

Witnesses:
 ROBERT C. TOTTEN,
 JOHN F. WILL.

---

Copies of this patent may be obtained for five cents each, by addressing the "Commissioner of Patents, Washington, D. C."